(12) United States Patent
Duncan et al.

(10) Patent No.: US 10,095,526 B2
(45) Date of Patent: Oct. 9, 2018

(54) TECHNIQUE FOR IMPROVING PERFORMANCE IN MULTI-THREADED PROCESSING UNITS

(71) Applicant: NVIDIA Corporation, Santa Clara, CA (US)

(72) Inventors: Samuel H. Duncan, Arlington, MA (US); Gary Ward, Santa Clara, CA (US); M. Wasiur Rashid, San Jose, CA (US); Lincoln G. Garlick, Santa Clara, CA (US); Wojciech Jan Truty, Redwood City, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 366 days.

(21) Appl. No.: 13/651,131

(22) Filed: Oct. 12, 2012

(65) Prior Publication Data
US 2014/0109102 A1   Apr. 17, 2014

(51) Int. Cl.
*G06F 9/46* (2006.01)
*G06F 9/38* (2018.01)
*G06F 9/48* (2006.01)
*G06F 9/50* (2006.01)

(52) U.S. Cl.
CPC .......... *G06F 9/3887* (2013.01); *G06F 9/3851* (2013.01); *G06F 9/4881* (2013.01); *G06F 9/5027* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 6,260,058 B1* | 7/2001 | Hoenninger et al. | 718/107 |
| 7,370,156 B1* | 5/2008 | Nguyen | G06F 9/5066 711/100 |
| 7,506,134 B1* | 3/2009 | Juffa et al. | 712/16 |
| 8,074,093 B1* | 12/2011 | Johnson | 713/322 |
| 2002/0078310 A1* | 6/2002 | Frank et al. | 711/148 |
| 2010/0005472 A1* | 1/2010 | Krishnaraj et al. | 718/104 |
| 2010/0205606 A1* | 8/2010 | Panzer | 718/102 |
| 2010/0235845 A1* | 9/2010 | Bates et al. | 718/105 |
| 2010/0257538 A1* | 10/2010 | Zhao et al. | 718/106 |
| 2011/0107046 A1* | 5/2011 | Chen et al. | 711/162 |
| 2011/0292057 A1* | 12/2011 | Schmit et al. | 345/520 |

FOREIGN PATENT DOCUMENTS

| | | |
|---|---|---|
| CN | 1387649 A | 12/2002 |
| TW | I299465 B | 8/2008 |

* cited by examiner

*Primary Examiner* — Kenneth Tang
(74) *Attorney, Agent, or Firm* — Artegis Law Group, LLP

(57) ABSTRACT

A multi-threaded processing unit includes a hardware pre-processor coupled to one or more processing engines (e.g., copy engines, GPCs, etc.) that implement pre-emption techniques by dividing tasks into smaller subtasks and scheduling subtasks on the processing engines based on the priority of the tasks. By limiting the size of the subtasks, higher priority tasks may be executed quickly without switching the context state of the processing engine. Tasks may be subdivided based on a threshold size or by taking into account other consideration such as physical boundaries of the memory system.

20 Claims, 8 Drawing Sheets

TECHNIQUE FOR IMPROVING PERFORMANCE IN MULTI-THREADED PROCESSING UNITS

BACKGROUND OF THE INVENTION

Field of the Invention

The invention generally relates to scheduling and, more specifically, to techniques for improving performance in multi-threaded processing units.

Description of the Related Art

Typically, computer systems share hardware between multiple applications. In a central processing unit (CPU), an application is executed until an event causes a context switch to a different application. A context switch may be triggered due to certain operating conditions, such as reaching a particular point in the execution flow that requires some action by a different process or hardware unit, the expiration of a time quanta allocated to a process, or as a consequence of the system needing to run a higher-priority process (i.e., pre-emption).

There are several common approaches to implementing a context switch. In one implementation, the CPU may stop processing at an instruction boundary, push context state onto a stack, and load a different context. In a different approach implemented by graphics processing units (GPUs), the GPU stops issuing new instructions and waits for the current work to complete processing through a pipeline (i.e., Wait-For-Idle or WFI). In this approach, the GPU is not required to save any context state because the already issued work is allowed to complete processing. In another approach implemented by GPUs, the GPU may stop processing of all work currently in the pipeline, write the context state to memory, and load a different context.

Typically, GPU context state is much larger than CPU context state. In addition, GPUs typically implement longer pipelines that take hundreds or thousands of clock cycles to complete. Thus, in either of the latter two approaches set forth above, a large context switch latency penalty is introduced. In the first approach (the WFI approach), previously issued instructions are required to complete processing in the pipeline, which takes hundreds or thousands of clock cycles before new instructions associated with the different context may be issued. In the second approach, saving the large GPU context state may take hundreds or even thousands of clock cycles as well.

Accordingly, what is needed in the art is a more effective approach for executing multi-threaded operations on GPUs that have large graphics pipelines.

SUMMARY OF THE INVENTION

One embodiment of the present invention sets forth a method for improving performance in multi-threaded processing engines. The method includes the steps of receiving a first task to be executed by a processing engine, dividing the first task into a first set of subtasks, and issuing at least one subtask from the first set of subtasks to the processing engine for processing, where each subtask in the first set of subtasks is smaller than a threshold size. The method further includes the steps of receiving a second task to be executed by the processing engine (the second task having a higher priority than the first task), dividing the second task into a second set of subtasks, and preempting the first task by issuing at least one subtask from the second set of subtasks to the processing engine for processing prior to issuing all of the subtasks from the first set of subtasks to the processing engine for processing, where each subtask in the second set of subtasks is smaller than the threshold size.

Another embodiment of the present invention sets forth a system for improving performance in multi-threaded processing engines. The system includes one or more processing engines configured to execute tasks and a pre-processor coupled to the one or more processing engines. The pre-processor is configured to perform the method set forth above. Yet another embodiment of the present invention sets forth a computing device that includes one or more processing engines configured to execute tasks and a pre-processor coupled to the one or more processing engines. The pre-processor of the computing device is configured to perform the method set forth above.

One advantage of the disclosed technique is that context switching at each individual processing engine is unnecessary and, therefore, the processing engines are not implemented with complex scheduling logic and/or context switching capabilities. Applications may be pre-empted simply by letting small tasks finish executing and then switching to the higher priority task. In addition, the technique is completely transparent to a programmer, which can generate tasks of any size without worrying about the latency that may be generated in the system that prevents higher priority tasks from being executed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the present disclosure. However, it will be apparent to one of skill in the art that the invention may be practiced without one or more of these specific details.

System Overview

Figure 1:
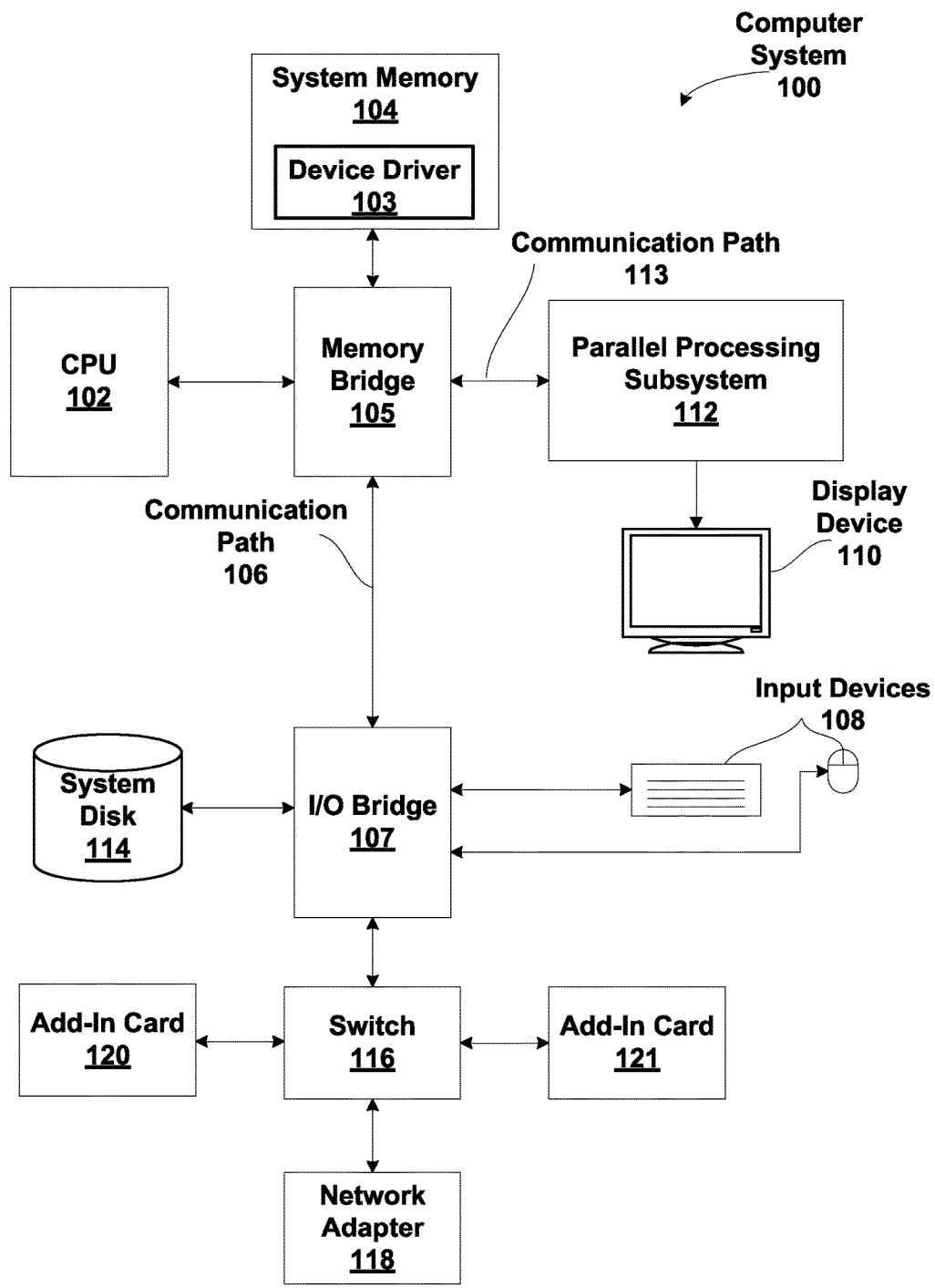
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect Express (PCIe), Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communications paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
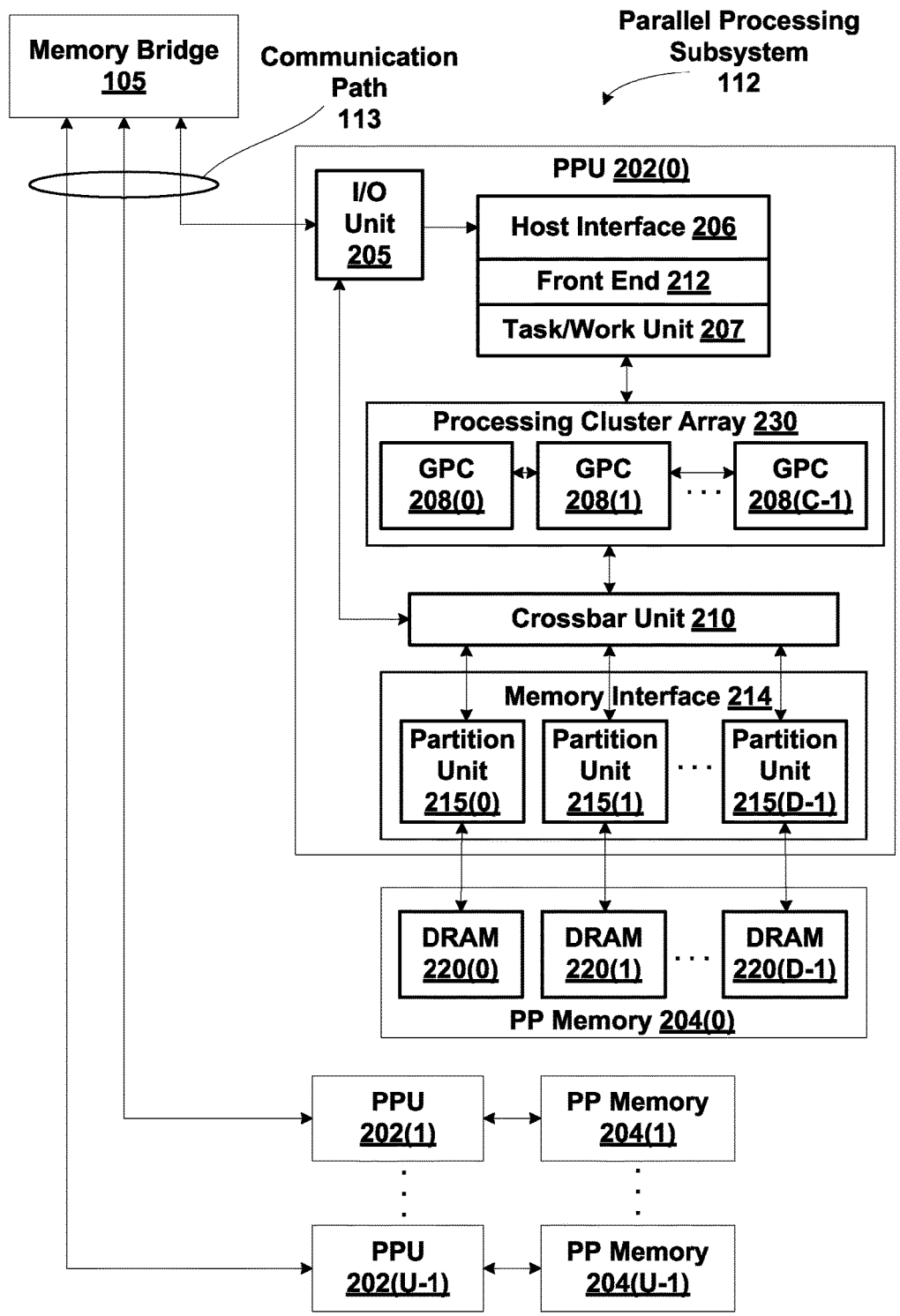
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer (i.e., a buffer in memory that stores a command stream for the PPU 202) to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
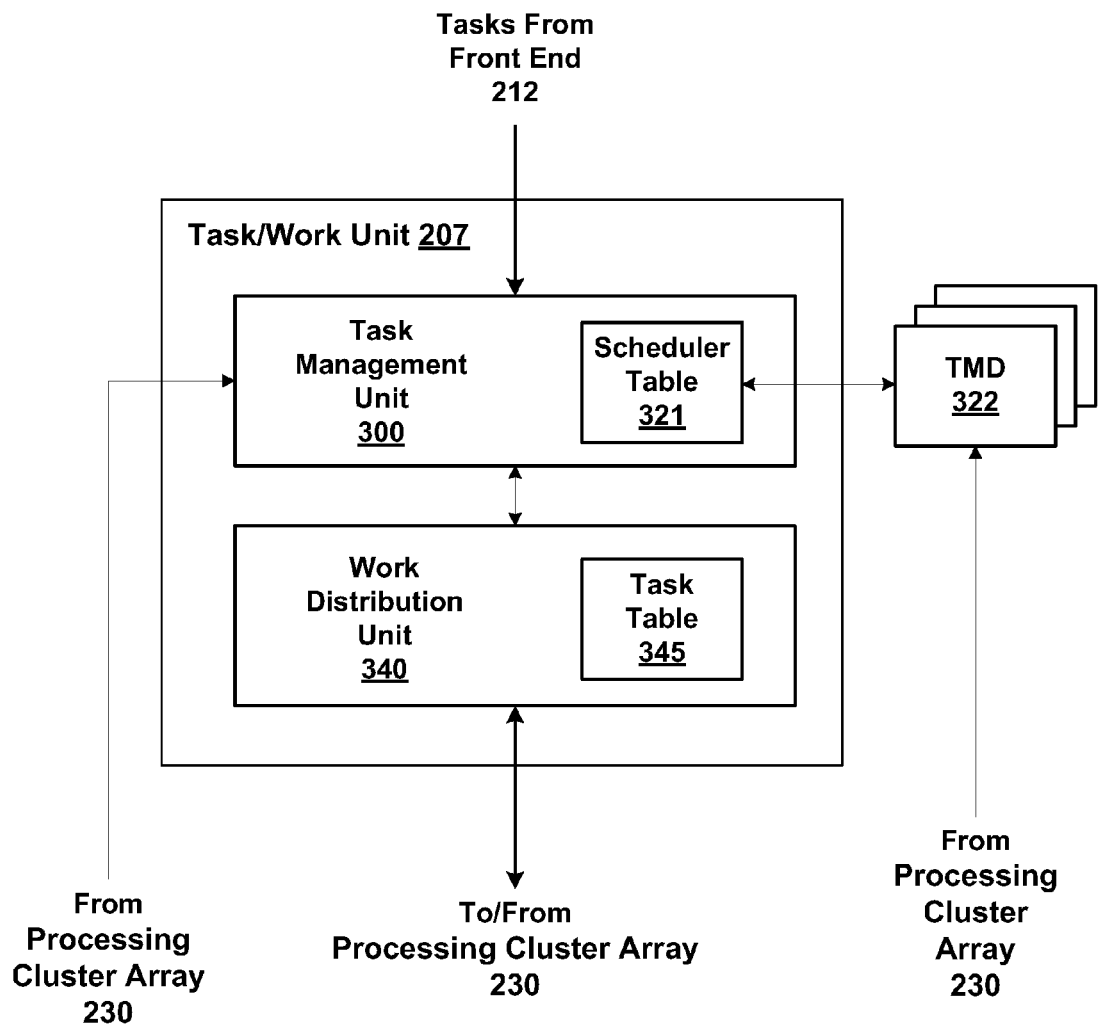
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
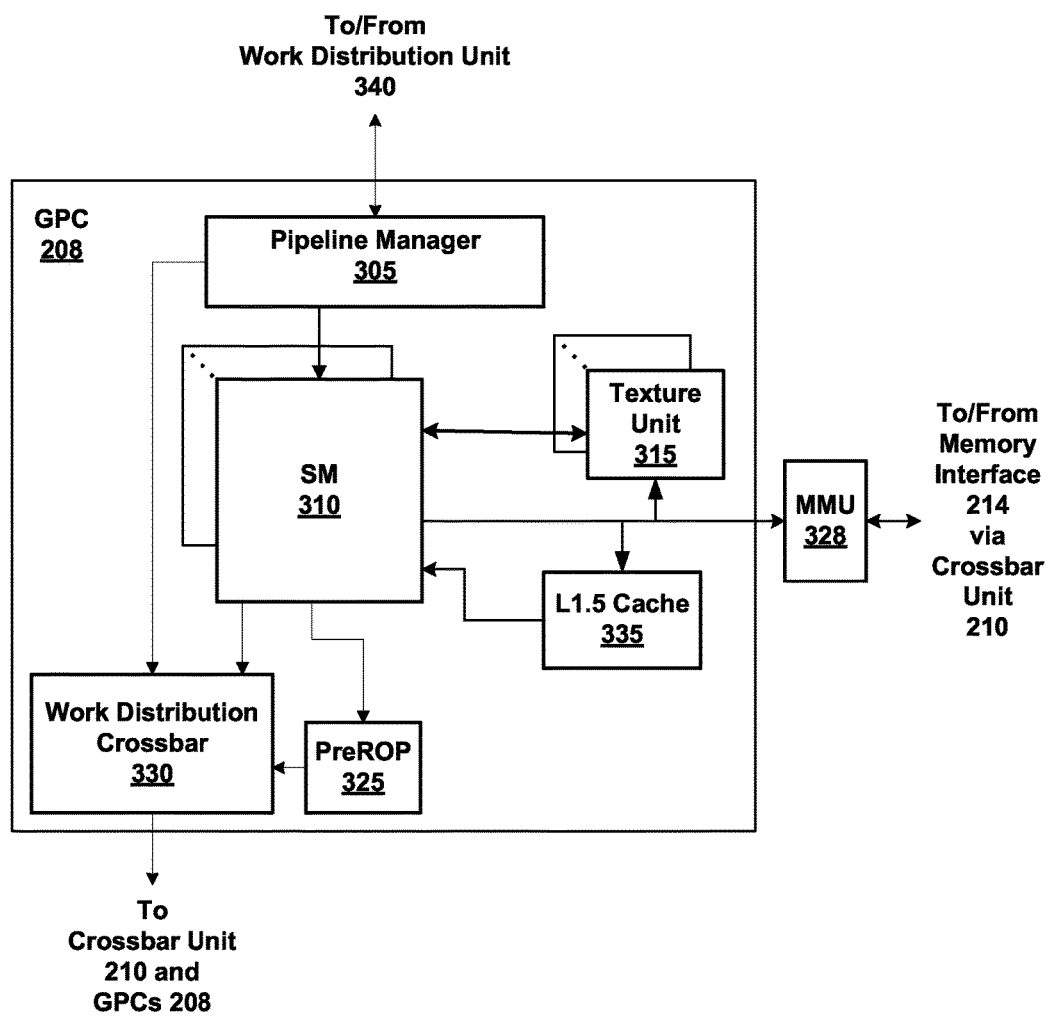
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2)

caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
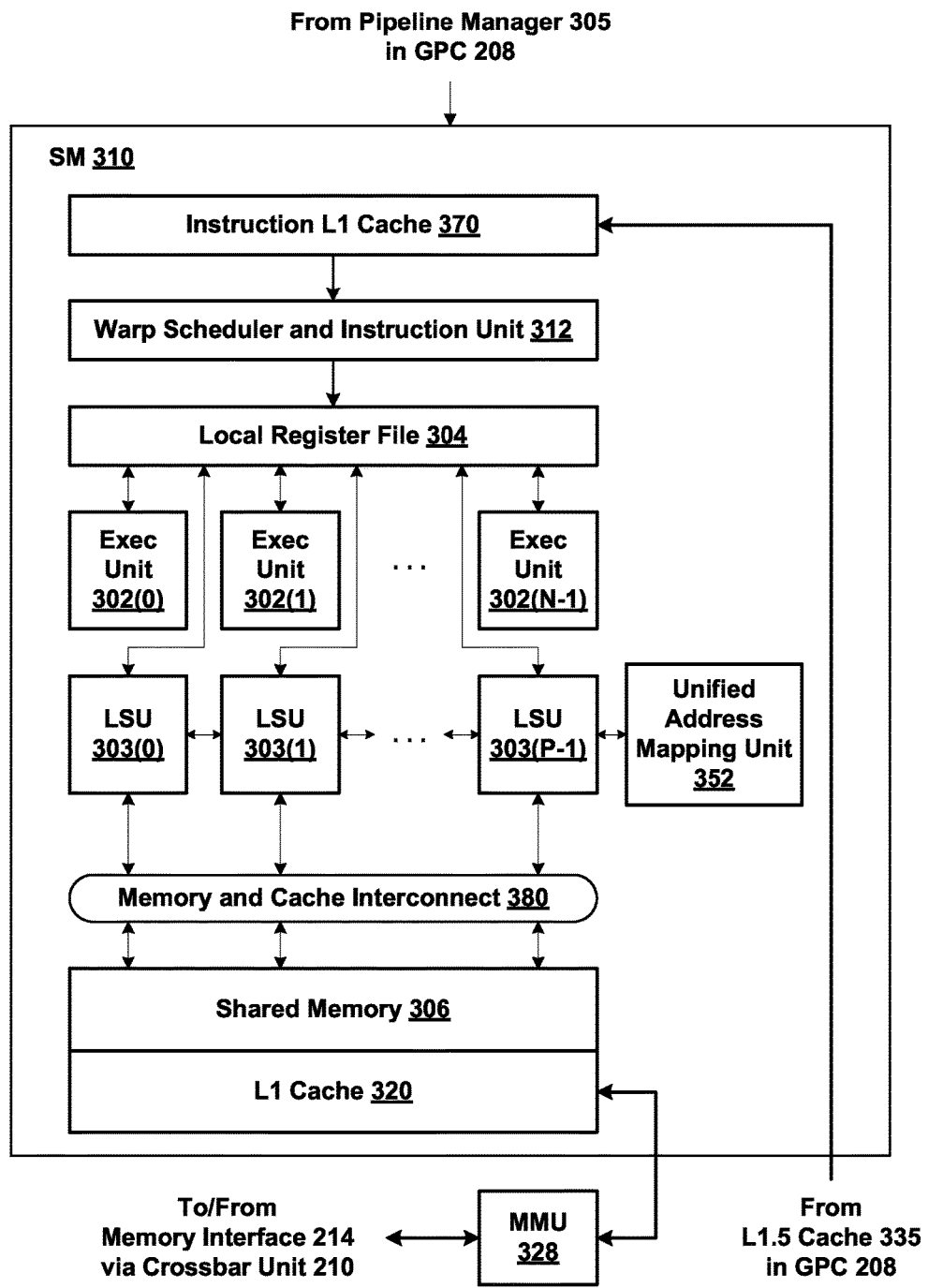
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

The task management unit 300 manages compute tasks to be scheduled as an array of TMD groups that are stored in the scheduler table 321. A TMD group is a set of compute tasks with the same scheduling priority. The number of TMD groups, or priority levels, may be one or more. Within each TMD group, the compute tasks at the respective priority level are stored in a list, which can be implemented with a linked list, and hereinafter a linked list is assumed. Each entry in a linked list stores a task pointer to a TMD 322 in memory and a pointer to the next entry in the respective linked list. A head pointer and a tail pointer for the linked list are stored for each TMD group. A TMD group having no tasks has a head pointer that equals the tail pointer and an empty bit is set TRUE.

When compute tasks are received from the host interface 206, the task management unit 300 inserts the compute tasks into a TMD group. More specifically, a task pointer to the TMD 322 corresponding to the compute task is added to the tail of the linked list for that group unless a special TMD bit is set which causes the task to be added to the head of the linked list. Even though all tasks within a TMD group have the same scheduling priority level, the head of the TMD group linked list is the first compute task that is selected by the task management unit 300 and scheduled for execution. Thus, the compute task at the head of the linked list has a relatively higher priority compared with other compute tasks at the same priority level. Similarly, each successive compute task in the linked list at the same priority level as a lower priority relative to preceding compute tasks in the linked list. Therefore, the task management unit 300 is able to schedule the compute tasks within a TMD group in input order relative to one another (assuming none are specially marked to add to the head of the TMD group). Since the TMD group is specified as part of the TMD structure, the TMD group of a compute task cannot be changed while the compute task is being executed. Compute tasks can also be received from the processing cluster array 230.

The collection of compute tasks into groups based on priority levels prior to scheduling the compute tasks allows for a decoupling of the rate at which compute tasks are received by the task management unit 300 from the rate at which compute tasks are output to the work distribution unit 340 for execution. The task management unit 300 is generally able to accept compute tasks from one or more push buffers output by the host interface 206 at a faster rate than the compute tasks may be output for execution by the work distribution unit 340. The input from the different push buffers are independent streams, typically generated by the same application program in order to have multiple sets of dependent tasks, but in some embodiments, multiple application programs can write to the pushbuffers. The task management unit 300 may be configured to buffer the compute tasks in the scheduler table 321 and later select one or more compute tasks from the scheduler table 321 for output to the work distribution unit 340. By selecting the compute tasks after they are buffered, the task management unit may make the selection based on more information compared with selecting a compute task as compute tasks are received. For example, the task management unit 300 may buffer several low-priority tasks that are received before a high-priority task. The buffering enables the task management unit 300 to select the high-priority task for output before the low-priority tasks.

The task management unit 300 may perform selection to schedule the compute tasks using several different techniques: round-robin, priority, or partitioned priority scheduling. For each of the different scheduling techniques, when a compute task is selected to be scheduled, the selected compute task is removed from the TMD group in which the selected compute task is stored. Regardless of the scheduling technique, the task management unit 300 is able to quickly select a compute task by selecting the first entry in the linked list of the appropriate group. The task management unit 300 may easily organize, and, if needed, reorder the compute tasks by simply changing the ordering of the task pointers in the linked lists of the TMD groups. Therefore, the compute tasks may be scheduled and/or executed in an order that is different than the order in which the task pointers are received by the task management unit 300 from the host interface 206.

The simplest scheduling scheme is for the task management unit 300 to schedule the compute task at the head of each group (if a compute task exists in the group) and rotate through the groups in round-robin order. Another scheduling technique is priority scheduling that selects the compute tasks in strict priority order. The task management unit 300 selects a compute task from the highest priority TMD group that has at least one compute task, starting at the head of the group.

Reduced Latency Multi-Threaded Architecture

Figure 4:
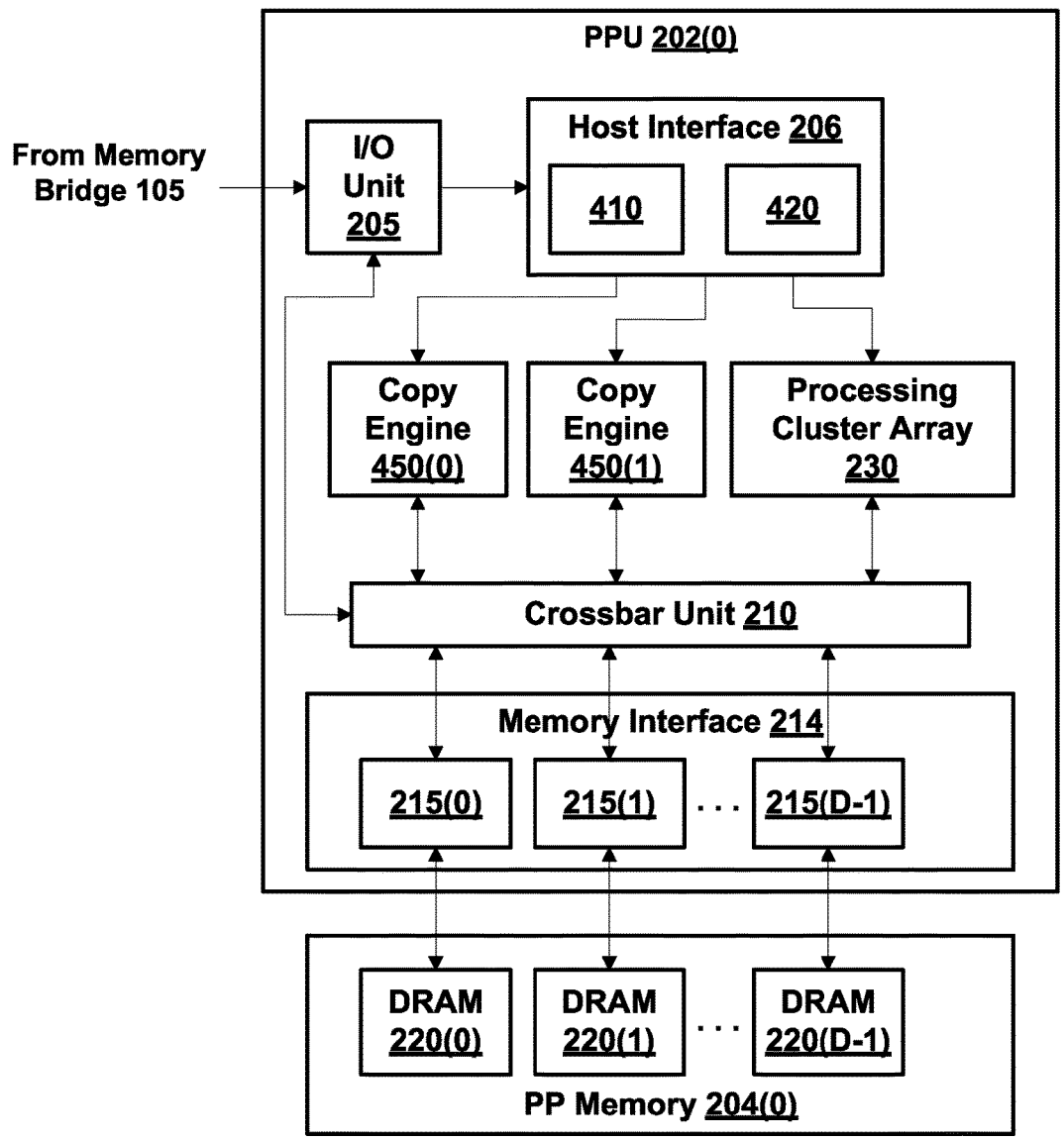
FIG. 4 illustrates the parallel processing unit (PPU) of FIG. 2, according to one embodiment of the present invention.

FIG. 4 illustrates the PPU 202(0) of FIG. 2, according to one embodiment of the present invention. As shown in FIG. 4, PPU 202(0) includes an I/O unit 205 that receives work (i.e., tasks) to be executed by one or more processing engines of PPU 202(0). For example, I/O unit 205 may receive commands related to processing tasks that are directed to host interface 206 or commands related to memory access operations (i.e., read/write operations) that are directed to memory interface 214 via crossbar unit 210. Commands related to processing tasks may specify one or more pushbuffers that include command streams for execution by PPU 202(0). The host interface 206 reads commands from each of the pushbuffers and transmits the command stream stored in the pushbuffers to the appropriate processing engine. For example, some commands may be related to a graphics rendering task, which are transmitted to the processing cluster array 230 via a front end unit 212 and a task/work unit 207 (not explicitly shown). Other commands may be related to data transfer tasks (i.e., copy operations), which are transmitted to the one or more copy engines 450.

The copy engines 450 are configured to perform copy operations that move data from one memory location to another memory location. For example, the copy engine 450(0) may receive an instruction that indicates a 16 MB block of memory should be copied from PP memory 204(0) into system memory 104. One type of copy command includes a source address, a destination address, and a length of data to be copied. Another type of copy command includes parameters that indicate a 2D array of addresses to be copied (i.e., a copy rectangle command) from a source array to a destination array. The copy engines 450 may execute concurrently with the processing cluster array 230. In order to perform copy operations, the copy engine 450 configures the crossbar 210 such that memory reads and writes may be performed between the specific memory locations identified in the copy commands. Data may be copied from the DRAMs 220 to the copy engine and then transmitted to the destination address (e.g., from the copy engine 450 to the system memory 104), or the copy engine 450 may configure the crossbar such that the data is transmitted directly to I/O unit 205 and transmitted to the system memory 104 via communications path 113.

Conventionally, the size of a copy operation, as specified by an application, is limited by the size of the physical memory. For example, an application may transmit a command to PPU 202(0) that specifies that a copy operation entails copying a 1 GB block of memory from PP memory 204 to system memory 104. As the copy engine 450(0) processes the command, copy engine 450(0) configures the crossbar 210 to access a particular memory partition (e.g., memory partition 215(0)) for communicating with the DRAM storing at least part of the 1 GB block of memory (e.g., DRAM 220(0)). The copy engine 450(0) then transmits a memory read request to the DRAM 220(0), thereby accessing the first 256-bits of the 1 GB block of memory. Copy engine 450(0) receives the 256-bit data output by the DRAM 220(0) in response to the memory read request. Copy engine 450(0) then configures the crossbar 210 such that copy engine 450(0) may transmit a write request to the system memory 104 via I/O unit 205, storing the 256-bits of data at the destination address. Then, copy engine 450(0) configures the crossbar 210 to communicate with DRAM 220(0) and transmits a second memory read request to the DRAM 220(0) to access the next 256-bits of the 1 GB block of memory. The DRAM 220(0) outputs the next 256-bit data to the copy engine 450(0), which transmits a write request including the next 256-bits of data to the system memory 104 via I/O unit 205. The copy engine 450(0) continues in this fashion until the entire 1 GB block of memory has been transferred from DRAM 220(0) (or the other DRAM units if the block spans multiple DRAM units) to system memory 104. In alternative embodiments, copy engine 450(0) may configure memory interface 214 to perform direct memory transfers between DRAM 220(0) and system memory 104 by configuring I/O unit 205 and crossbar 210 such that DRAM 220(0) may communicate directly with I/O unit 205 and transmit a write command to system memory 104 without direct intervention by copy engine 450(0). In other embodiments, copy engines 450 have a pipelined architecture that enables multiple copy commands to be executed concurrently. For example, a first read command associated with a first copy operation may be issued to the DRAM 220. While data associated with the first read command is being fetched, a second read command associated with a second copy operation may be issued to the DRAM 220. In such embodiments, a higher priority copy operation may be issued to a copy engine, which begins execution of the higher priority copy operation, before a lower priority copy operation has completed execution.

It will be appreciated that copy operations may take a significant number of clock cycles to complete, depending on the size of the block of memory to be copied. Conventional copy engines do not implement a pre-emption capability, meaning that once a copy operation is transmitted to the copy engine, the full copy operation would be executed before another copy operation could be transmitted to the copy engine. In other words, when a higher priority application transmits a copy operation to PPU 202(0), the higher priority copy operation could not be executed until the previously scheduled copy operation associated with a lower priority application was complete. There are many ways to address this long latency period.

First, the long latency period could be addressed by adding pre-emption capabilities to each individual processing engine of PPU 202(0) (e.g., copy engine 450(0), copy engine 450(1), GPC 208(0), etc.), thereby enabling operations associated with higher priority applications to pre-empt operations associated with lower priority applications. For example, pre-emption capabilities could be added to a processing engine by including additional priority scheduling logic and/or context switching logic. The copy engine 450 could track multiple copy operations and execute higher priority copy operations over lower priority copy operations using scheduling algorithms known to those of skill in the art. However, these hardware-level changes would increase the size and complexity of each of the processing engines in PPU 202(0). Increased size means increased cost as well as additional power draw and generated heat from the additional logic. Therefore, it is not desirable to implement pre-emption in each individual processing engine.

Second, the long latency period could be addressed by limiting the size of copy operations (or other processing tasks) issued to PPU 202(0) by each individual application. This approach requires the programmer to manage the size of processing tasks such that large tasks associated with long latency periods are never transmitted to the PPU 202(0). This approach is not desirable because it makes programming more complex, requiring the application to manually schedule hundreds or thousands of separate operations instead of sending one operation to the PPU 202. In addition, additional logic may need to be added to the device driver 103 and/or PPU 202 to ensure that copy operations do not exceed a threshold size that would trigger long latency periods. If this logic was not added, then a programmer could simply schedule a large processing task on PPU 202 that would not permit low latency pre-emption.

The two approaches set forth above are undesirable because they unnecessarily increase the complexity and size of the PPU 202(0) or because they expose too much of the pre-emption implementation to the application level, relying on the programmer for efficient operation. Thus, the technique described herein implements a different approach that introduces a hardware implemented pre-processor 410 between the application and the various processing engines of the PPU 202(0). The pre-processor 410 is configured to receive tasks transmitted to PPU 202(0) from one or more applications and implement pre-emption of low priority tasks by high priority tasks. The pre-processor 410 implements pre-emption by dividing tasks into a set of smaller subtasks such that issuing each subtask may be performed independently of each of the other subtasks. The size of each subtask is limited to a threshold size such that execution of the subtask by a processing engine does not introduce a long latency period before a different subtask may be executed by the processing engine. In one embodiment, the pre-processor 410 includes logic for tracking the state of a task. For example, pre-processor 410 may include registers for storing the state of a task such as the next memory location to be copied in the block of memory associated with a copy operation. In another embodiment, pre-processor 410 may store the state of a task in PP memory 204.

For example, to illustrate the operation of copy engines 450, a copy operation may be received by host interface 206 as part of the command stream included in a pushbuffer. The copy operation may specify a large block of memory to be copied from PP memory 204 to system memory 104. In conventional systems, the host interface would decode at least part of the command to determine that the command should be transmitted to one of the available copy engines and the entire copy operation would be transmitted to a first copy engine. The copy engine would then execute the copy operation until the entire block of memory was copied into system memory.

In contrast, host interface 206 of FIG. 4 implements a hardware pre-processor 410 that subdivides the copy operation into multiple subtasks associated with copy operations for small chunks of the block of memory specified by the initial copy operation. For example, a copy operation may request a large 256 MB block of memory to be copied from PP memory 204 to system memory 104. The pre-processor 410 transmits a copy command to copy engine 450(0) for the first 4 kB of memory of the 256 MB block of memory. The pre-processor 410 then modifies the original copy operation by incrementing the starting memory address included in the copy command by 4 kB and stores the modified copy command until copy engine 450(0) has finished executing the first 4 kB copy operation. Then, the pre-processor 410 transmits a new copy command to copy engine 450(0) for the next 4 kB of memory, and so forth. However, if host interface 206 receives another copy operation from a higher priority application before the entire 256 MB block of memory has been copied, then pre-processor 410 pre-empts the lower priority copy operation by transmitting a first copy command associated with the higher priority copy operation to copy engine 450(0) instead of the next subsequent copy command associated with the lower priority copy operation. Thus, in a relatively few number of clock cycles, a higher priority application may pre-empt execution of a particular task on a given processing engine because the processing engine is never allocated to the particular task for more than a maximum number of clock cycles. The latency period associated with implementing pre-emption in this manner may be much smaller than implementing pre-emption directly within a processing engine executing unbounded tasks (e.g., saving context state and loading a separate context to execute the higher priority task), and does not require the programmer to manually manage pre-emption latency by limiting the size of tasks transmitted to PPU 202.

In some embodiments, copy operations generated by an application may specify additional operations (e.g., a semaphore release, triggering an interrupt, flushing memory, etc.) to be executed by the copy engine 450 once the copy operation is complete. These additional operations may be included in the copy command transmitted to the copy engine 450 as extra bits in the command, or may be sent as a separate command after the copy command. Pre-processor 410 may be configured to schedule the additional operations in relation to the subtasks for a given task. For example, if the additional operations are specified in the original copy operation, pre-processor 410 may configure each of the subtasks such that only the final subtask of the original task includes the additional operations.

In one embodiment, pre-processor 410 tracks each of the pending operations in an ordered list 420 arranged according to priority. Pre-processor 410 is configured to schedule the highest priority pending operation. In another embodiment, host interface 206 includes a number of FIFOs (not shown), each FIFO associated with a given priority level. As host interface 206 receives tasks, the tasks are added to the particular FIFO associated with that tasks priority level. Pre-processor 410 then selects the next pending task in the highest priority FIFO that includes at least one pending task to schedule on the available processing engine. The pending task is divided into a set of smaller subtasks and the subtasks are scheduled on the appropriate processing engine.

In some embodiments, host interface 206 operates asynchronously from the various processing engines. In other words, there may be some latency between host interface 206 scheduling the task on a given processing engine and that processing engine executing the task. In such embodiments, each processing engine may queue a number of pending tasks for execution. For example, copy engine 450(0) may include a FIFO that stores up to 8 pending copy commands. Therefore, host interface 206 can transmit up to 8 copy commands to the copy engine 450(0), which are executed in order the copy commands are received by copy engine 450(0). Host interface 206 may also transmit other commands or operations to other processing engines, such as processing cluster array 230, while the copy commands are executed. It will be appreciated that, in some situations, it may be desirable to transmit multiple subtasks to a given processing engine to avoid idle time caused by the inherent latency between scheduling and execution.

Host interface 206 may be managing many tasks simultaneously for a plurality of different processing engines. Each clock cycle, host interface 206 may check a particular processing engine to determine whether that processing engine is idle (i.e., is available to execute a new subtask). In one embodiment, host interface 206 and the processing engines have a dedicated interface, such as a single wire interconnect, that indicates whether the processing engine is idle. In another embodiment, the host interface 206 and the processing engines communicate over an existing bidirectional communications bus that enables the processing engines to send a command to host interface 206 that indicates whether the processing engine is idle. In yet another embodiment, the host interface 206 and processing engines implement a credit-based flow control interface. For example, if copy engine 450(0) includes a FIFO for storing a plurality of copy commands to be executed, copy engine 450(0) may issue a number of credits to host interface 206 where the number of credits reflects the number of open slots in the FIFO in copy engine 450(0). As pre-processor 410 issues copy commands to copy engine 450(0), host interface 206 debits the number of credits, and as copy engine 450(0) completes execution of a copy command previously sent to copy engine 450(0) a new credit is sent to host interface 206 that indicates that another slot in the FIFO is available.

Depending on the number of processing engines in PPU 202, the processing engine may be idle for a number of clock cycles before the host interface 206 can schedule the next subtask on the processing engine. Therefore, in one embodiment, pre-processor 410 is configured to ensure that two or more subtasks are queued for execution by a given processing engine whenever there are at least two subtasks ready for execution. For example, a copy engine 450(0) may include a FIFO that stores up to 8 copy commands queued for subsequent execution. When idle, the copy engine 450(0) may then execute the next copy command from the FIFO without waiting for a new command to be issued by the host interface 206. Without this implementation, the copy engine 450(0) may waste many cycles simply communicating the idle state to the host interface 206 and waiting for the pre-processor 410 to issue the next copy command. The FIFO in the copy engine 450(0) enables more efficient execution allowing the copy engine 450(0) to begin processing the next subtask while the pre-processor 410 determines which subtask should be sent to the copy engine 450(0) next and whether the currently executing operation should be pre-empted by a higher priority application. In one embodiment, a programmable register sets the number of subtasks pending at a processing engine at a given time. For example, the register may indicate that 4 subtasks should be queued for execution by a processing engine at any one time. Based on the value in the register, pre-processor 410 may send a set number of copy commands to copy engine 450(0) which are stored in the FIFO. As each copy command completes execution, pre-processor 410 sends a new copy command to copy engine 450(0) such that the FIFO has approximately the set number of pending copy commands ready for execution at any one time. In other words, the value of the register sets a threshold number of outstanding subtasks that may be queued for execution by a processing engine. The processing engine is considered available when the number of outstanding subtasks in the processing engine is less than the threshold number of outstanding subtasks. The threshold number of outstanding subtasks may be set to ensure that the pre-emption of a given task is completed in a maximum number of clock cycles (i.e., because the maximum size and maximum number of outstanding subtasks dictates a maximum time before a processing engine will be idle).

As described above in connection with FIG. 4, pre-processor 410 divides tasks into a set of smaller subtasks such that subtasks can be transmitted to a processing engine without allocating that processing engine to finish the entire task before being pre-empted by a different task from a higher priority application. In one embodiment, pre-processor 410 simply divides the tasks based on a threshold size for each subtask. However, in further embodiments, pre-processor 410 may be configured to consider other criteria for subdividing tasks as well.

Figure 5A:
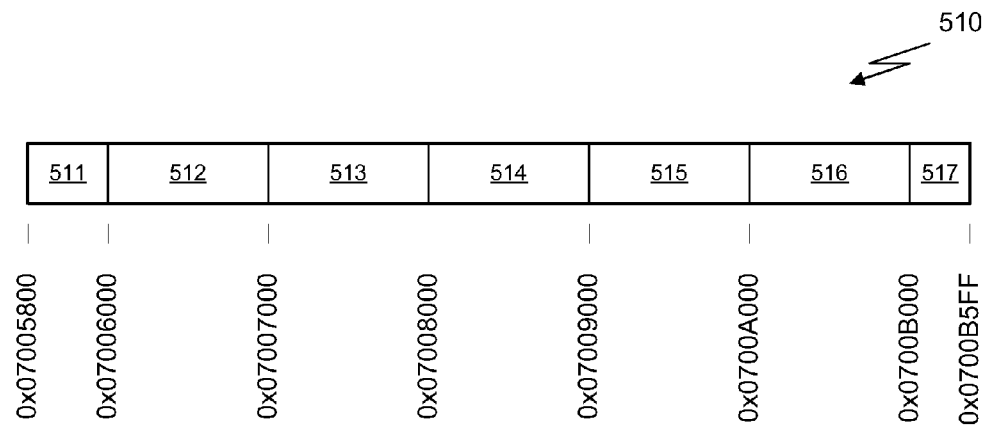
FIGS. 5A and 5B illustrate two approaches for dividing a task into a set of subtasks, according to one embodiment of the present invention.
Figure 5B:
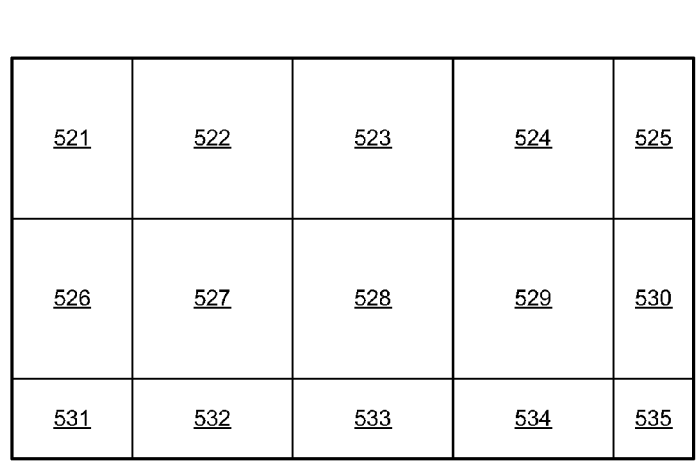

FIGS. 5A and 5B illustrate two approaches for dividing a task into a set of subtasks, according to one embodiment of the present invention. As shown in FIG. 5A, a copy operation may indicate that copy engine 450(0) should copy a block of memory 510 from PP memory 204 to system memory 104. The instruction specifying the copy operation may include a starting address for the block of memory 510 in PP memory 204 (e.g., 0x07005800), a starting address for the destination block of memory in system memory 104, and a length associated with the block of memory (e.g., 24,064 Bytes). As shown, each unique memory address is a 32-bit address that references a single byte of memory, however, other addressing architectures are contemplated as within the scope of the present invention, such as 64-bit addressing or where each 32-bit address references four bytes (i.e., 32 bits) of memory.

In one embodiment, pre-processor 410 is configured to divide the copy operation into a set of smaller copy operations that perform a data copy of less than or equal to a threshold value such as 4 kB (i.e., 4096 bytes). For example, a system 100 may implement a unified virtual memory architecture using 4 kB pages. Performing data copy operations on 4 kB pages or less is more efficient because the latency for finishing a copy operation of 4 kB is not prohibitively long and the data from the copy operation, assuming the operation is page aligned, is included in a single memory page. In addition to limiting each subtask to copy operations of less than or equal to the threshold value, pre-processor 410 is configured to align the copy operations on boundaries of the physical memory. Proper memory alignment allows for more efficient memory accesses. For example, GDDR5 SDRAM (graphics double data rate synchronous dynamic random access memory) implements a 32-bit data bus with an 8n-prefetch architecture that allows for 256-bits (i.e., 32 bytes) to be read or written per memory access request. However, in order to read 256 bits in a single memory request to the GDDR5 DRAM, the 256 bits must be aligned on 32-byte boundaries.

As shown in FIG. 5A, a first subtask 511 has a starting address at 0x07005800, which is aligned on a 32-byte boundary (i.e., in binary, the five least significant bits of the memory address are zeros). However, the starting address of the first subtask 511 is not aligned on a 4 kB memory boundary (e.g., a page boundary). Therefore, pre-processor 410 generates a copy command for the first subtask 511 that includes a starting address of the first subtask 511, a destination address for the first subtask (equal to the destination address for the original copy operation), and a length of 2 kB, which corresponds to the difference between the starting address of the first subtask 511 and the next 4 kB memory boundary. The pre-processor 410 then transmits the copy command for the first subtask 511 to the copy engine 450(0) for execution and modifies the original copy operation by incrementing the source address and destination address by the length of the first subtask 511 (i.e., 2 kB) and decrementing the length of the original copy operation, which represents the remaining block of memory to be copied as part of the original copy operation.

When copy engine 450(0) is ready for another copy command for execution (i.e., either because copy engine 450(0) is idle or includes empty slots in a FIFO of pending commands), pre-processor 410 generates another copy command for the next subtask of the modified copy operation. Pre-processor 410 generates a copy command for the second subtask 512 that includes a starting address of the second subtask 512 (i.e., 0x07006000), a destination address for the second subtask, and a length. Because the remaining copy operation is associated with a memory block longer than the 4 kB threshold value, pre-processor 410 sets the length of the second subtask to 4 kB. The copy command for the second subtask 512 is transmitted to the copy engine 450(0) and the modified copy operation is modified again by incrementing the source address and destination address by the length of the first subtask 512 (i.e., 4 kB) and decrementing the length of the modified copy operation.

Pre-processor 410 continues issuing copy commands to copy engine 450(0) related to the additional subtasks (i.e., subtasks 513, 514, 515, 516, and 517). The last subtask 517 is associated with a copy operation for a block of memory less than the 4 kB threshold size. Therefore, as shown in FIG. 5A, the copy command for the last subtask 517 has a length of 1536 bytes, which represents the remaining memory to be copied as part of the original copy operation.

It will be appreciated that during the process of dividing the original task into the set of subtasks, host interface 206 may receive another task from a higher priority application. For example, after pre-processor 410 transmits the copy command associated with the second subtask 512, the host interface 206 may receive a new task from a higher priority application. The new task from the higher priority application may be for a copy operation for a different memory block. Because the new task is of a higher priority than the original task, pre-processor 410 divides the new task into a set of subtasks and instead of transmitting a copy command associated with the third subtask 513 to the copy engine 450(0), the pre-processor 410 transmits a copy command related to the first subtask of the new task to the copy engine 450(0). The pre-processor 410 may then transmit subsequent copy commands associated with the other subtasks of the new task until the new task has been completely executed. Once copy engine 450(0) is available, pre-processor 410 transmits the third subtask 513 of the original copy operation to copy engine 450(0). Pre-processor 410 then finishes transmitting copy commands related to the remaining subtask of the original copy operation to copy engine 450(0) until the full copy operation has been completely executed.

In another embodiment, as shown in FIG. 5B, some types of memory copy operations may be performed on a rectangle (i.e., a 2D array of memory arranged in rows and columns). Each rectangle may be specified by a starting memory location (i.e., the upper left memory address in the rectangle) as well as a horizontal dimension and a vertical dimension (e.g., in number of distinct memory addresses or bytes). Accessing memory addresses in this fashion may be efficient because a specific memory row address or column address may be accessed for a plurality of consecutive memory locations, and the column address or row address, respectively, may be incremented to retrieve subsequent data more efficiently (i.e., by not changing either the row address or the column address). For example, rectangle 520 represents a copy operation for a block of memory that is 272 bytes in the horizontal dimension and 160 bytes in the vertical dimension.

For rectangle 520, pre-processor 410 divides the copy operation into a plurality of subtasks (i.e., 521, 522, etc.) that each correspond to a copy operation for a smaller rectangle of memory. For example, in this embodiment, the maximum sized rectangle that may be copied is 64 addresses wide (i.e., horizontal) by 64 addresses high (i.e., vertical). The total size of the threshold rectangle is 4 kB. First, pre-processor 410 would divide the rectangle into smaller rectangles of 64 rows or less (e.g., subtasks 521 through 525, subtasks 526 through 530, and subtasks 531 though 535). Then, the smaller rectangles are further divided into subtasks that correspond to rectangles less than or equal to the threshold size. The subtasks may be aligned to specific memory boundaries as well. For example, the first subtask 521 corresponds to a copy rectangle command 48 addresses wide by 64 addresses high (to be aligned on a 64-byte boundary), the second subtask 522 corresponds to a copy rectangle command 64 addresses wide by 64 addresses high, and so forth. Because the horizontal dimension of the original copy rectangle command was not aligned on a 64-byte boundary, the fifth subtask 525 corresponds to a copy rectangle command 32 addresses wide and 64 addresses high. For example, a frame buffer may be implemented in PP memory 204 as a 2D array of memory addresses, each 4 kB block storing data for a 16 pixel by 16 pixel tile of the frame buffer, where each pixel comprises 16 bytes of data (e.g., 32 bits per channel RGBA).

It will be appreciated that the various copy operations set forth above may be implemented in a virtual memory architecture. For example, the rectangle 520 may represent a data structure in virtual memory, where each aligned sub-rectangle (e.g., subtask 521, 522, etc.) corresponds to a different virtual memory page and, therefore, the original copy rectangle operation may not be associated with adjacent blocks of memory in physical memory (although each tile, e.g., is stored in a 4 kB block of adjacent physical memory locations).

Figure 6:
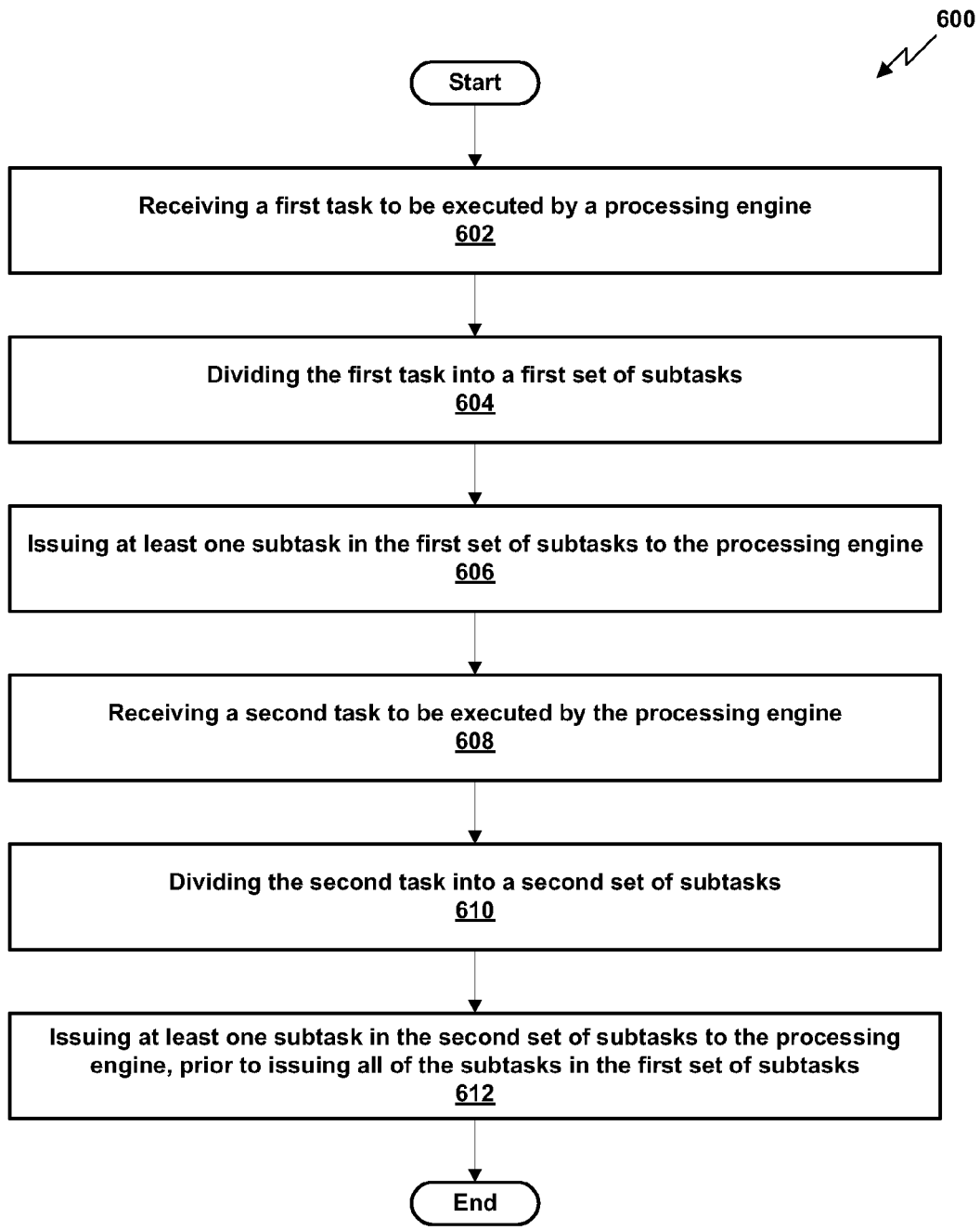
FIG. 6 is a flow diagram of method steps for improving performance in multi-threaded processing engines, according to one embodiment of the present invention.

FIG. 6 is a flow diagram of method steps for improving performance in multi-threaded processing engines, according to one embodiment of the present invention. Although the method steps are described in conjunction with the systems of FIGS. 1-5, persons of ordinary skill in the art will understand that any system configured to perform the method steps, in any order, is within the scope of the present invention.

As shown, a method 600 begins at step 602, where host interface 206 receives a first task to be executed by a processing engine. In one embodiment, a pre-processor 410 in host interface 206 reads commands from one or more pushbuffers. The commands may include copy operations (i.e., a task) intended to be transmitted to a copy engine 450(0). For example, the first task may be a copy operation that, when executed by the copy engine 450(0), causes the copy engine 450(0) to move data from a first memory location to a second memory location. At step 604, the host interface 206 divides the first task into a first set of subtasks. In one embodiment, the pre-processor 410 generates a new set of copy commands that, when executed by the copy engine 450(0), cause the copy engine 450(0) to move portions of the data associated with the original copy operation to portions of the second memory location. At step 606, host interface 206 issues at least one subtask in the first set of subtasks to the processing engine. In one embodiment, pre-processor 410 transmits a first subtask (i.e., copy command) associated with the first task to the copy engine 450(0). The copy engine 450(0) executes the first subtask, thereby copying a first portion of the memory block associated with the original copy operation. Additional subtasks (i.e., copy commands) are issued to the copy engine 450(0) as the copy engine 450(0) becomes available. In one embodiment, the host interface 206 issues one subtask at a time to the processing engine. In another embodiment, the processing engine may include a queue or FIFO such that the host interface 206 issues two or more subtasks to the processing engine at a time.

At step 608, before the host interface 206 has finished executing each subtask associated with the first task, thereby fully executing the original task, the host interface 206 receives a second task to be executed by the processing engine, where the second task is associated with a higher priority application than the first task. At step 610, the host interface 206 divides the second task into a second set of subtasks. At step 612, in order to pre-empt execution of the first task on the processing engine, the host interface 206 issues at least one subtask in the second set of subtasks to the processing engine prior to issuing each and every subtask in the first set of subtasks to the processing engine. For example, after having sent a plurality of copy commands to copy engine 450(0) associated with a first copy operation from the pushbuffer, the host interface 206 issues a plurality of copy commands to copy engine 450(0) associated with a second, higher priority copy operation to the processing engine. After each copy command associated with the second, higher priority copy operation has finished executing in the copy engine 450(0), the host interface 206 may resume transmitting any remaining copy commands associated with the first copy operation to the copy engine 450(0).

It will be appreciated that the scope of the present invention is not limited to copy commands and the copy engines 450 of a parallel processing engine (PPU) 202, and that various types of processing engines may implement pre-emption techniques using an intermediate hardware unit such as pre-processor 410. For example, GPCs 208 perform graphics tasks such as by executing a vertex shader (i.e., graphics program) on a set of vertices. Pre-processor 410 may implement an algorithm for receiving a set of vertices that define two or more primitives (i.e., triangles, quads, triangle strips, a mesh, etc.) defined in a 3D model and breaking up the mesh into a set of smaller meshes that are transmitted to the GPCs 208. Pre-processor 410 could be implemented to add pre-emption capabilities for any type of processing engine that receives input that is capable of being divided into smaller subtasks.

In sum, a multi-threaded processing engine may implement preemption techniques in one or more processing engines (e.g., copy engines, GPCs, etc.) by including an intermediate hardware unit to divide two or more tasks into smaller subtasks and schedule subtasks for the two or more tasks based on the priority of the tasks. By limiting the size of the subtasks, the latency period before the processing engine may be utilized to execute a higher priority task may be controlled to ensure that the higher priority task is executed quickly and efficiently.

One advantage of the disclosed technique is that context switching at each individual processing engine is unnecessary and, therefore, the processing engines are not implemented with complex scheduling logic and/or context switching capabilities. Applications may be pre-empted simply by letting small tasks finish executing and then switching to the higher priority task. In addition, the technique is completely transparent to a programmer, which can generate tasks of any size without worrying about the latency that may be generated in the system that prevents higher priority tasks from being executed.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for improving performance of a multi-threaded processor, the method comprising:

receiving a first task that is to be executed by a first processing engine that is implemented separately from a processing cluster array also included in the multi-threaded processor;

dividing, by a pre-processor also included in the multi-threaded processor, the first task into a first set of subtasks, wherein each subtask in the first set of subtasks is smaller than a threshold size and is to be executed by the first processing engine;

issuing at least one subtask from the first set of subtasks to the first processing engine for processing;

receiving a second task that also is to be executed by the first processing engine, wherein the second task has a higher priority than the first task;

dividing, by the pre-processor, the second task into a second set of subtasks, wherein each subtask in the second set of subtasks is smaller than the threshold size and is to be executed by the first processing engine;

preempting the first task by issuing at least one subtask from the second set of subtasks to the first processing engine for processing prior to issuing all of the subtasks from the first set of subtasks to the first processing engine for processing; and issuing at least one additional subtask from the first set of subtasks to the first processing engine for processing after issuing the at least one subtask from the second set of subtasks to the first processing engine for processing.

2. A computer-implemented method for improving performance of a multi-threaded processor, the method comprising:

receiving a first task that is to be executed by a first processing engine included in the multi-threaded processor, wherein the first task comprises a copy operation and the processing engine is a copy engine that is implemented separately from a processing cluster array also included the multi-threaded processor;

dividing, by a pre-processor also included in the multi-threaded processor, the first task into a first set of subtasks, wherein each subtask in the first set of subtasks is smaller than a threshold size and is to be executed by the first processing engine;

issuing at least one subtask from the first set of subtasks to the first processing engine for processing;

receiving a second task that also is to be executed by the first processing engine, wherein the second task has a higher priority than the first task;

dividing, by the pre-processor, the second task into a second set of subtasks, wherein each subtask in the second set of subtasks is smaller than the threshold size and is to be executed by the first processing engine;

preempting the first task by issuing at least one subtask from the second set of subtasks to the first processing engine for processing prior to issuing all of the subtasks from the first set of subtasks to the first processing engine for processing; and issuing at least one additional subtask from the first set of subtasks to the first processing engine for processing after issuing the at least one subtask from the second set of subtasks to the first processing engine for processing.

3. The method of claim 2, wherein dividing the first task into the first set of subtasks comprises dividing a source block of memory specified by the copy operation into two or more sub-blocks of memory, and generating two or more copy commands for execution by the copy engine corresponding to the two or more sub-blocks of memory.

4. The method of claim 3, wherein the sub-blocks of memory are aligned on a memory boundary.

5. The method of claim 3, wherein the copy operation comprises a copy rectangle operation, and the sub-blocks of memory comprise two-dimensional arrays of memory.

6. The method of claim 1, wherein the first task comprises a graphics operation associated with a plurality of primitives, and the subtasks in the first set of subtasks comprise at least two graphics operations associated with different subsets of primitives associated with the plurality of primitives.

7. The method of claim 1, further comprising tracking the first task and the second task in an ordered list based on priority.

8. The method of claim 1, wherein dividing the first task into the first set of subtasks comprises:

generating a first subtask that is less than or equal to the threshold size based on the first task;

modifying the first task to generate a modified first task;

monitoring the processing engine to determine when the processing engine is available for further processing; and when the processing engine is available, generating a second subtask that is less than or equal to the threshold size based on the modified first task, wherein the processing engine is available for further processing when a number of outstanding subtasks in the processing engine is less than a threshold number of outstanding subtasks.

9. The method of claim 1, further comprising transmitting two or more subtasks to the processing engine to be queued for execution.

10. A multi-threaded processor, comprising:

a processing cluster array;

one or more processing engines configured to execute tasks; and a pre-processor coupled to the one or more processing engines and configured to:

receive a first task that is to be executed by a first processing engine that is implemented separately from the processing cluster array;

divide the first task into a first set of subtasks, wherein each subtask in the first set of subtasks is smaller than a threshold size and is to be executed by the first processing engine;

issue at least one subtask from the first set of subtasks to the first processing engine for processing;

receive a second task that also is to be executed by the first processing engine, wherein the second task has a higher priority than the first task;

divide the second task into a second set of subtasks, wherein each subtask in the second set of subtasks is smaller than the threshold size and is to be executed by the first processing engine;

preempt the first task by issuing at least one subtask from the second set of subtasks to the first processing engine for processing prior to issuing all of the subtasks from the first set of subtasks to the first processing engine for processing; and issue at least one additional subtask from the first set of subtasks to the first processing engine for processing after issuing the at least one subtask from the second set of subtasks to the first processing engine for processing.

11. A multi-threaded processor, comprising:

a processing cluster array;

one or more processing engines configured to execute tasks; and a pre-processor coupled to the one or more processing engines and configured to:

receive a first task that is to be executed by a first processing engine;

divide the first task into a first set of subtasks, wherein each subtask in the first set of subtasks is smaller than a threshold size and is to be executed by the first processing engine, wherein the first task comprises a copy operation and the processing engine is a copy engine that is implemented separately from the processing cluster array;

issue at least one subtask from the first set of subtasks to the first processing engine for processing;

receive a second task that also is to be executed by the first processing engine, wherein the second task has a higher priority than the first task;

divide the second task into a second set of subtasks, wherein each subtask in the second set of subtasks is smaller than the threshold size and is to be executed by the first processing engine;

preempt the first task by issuing at least one subtask from the second set of subtasks to the first processing engine for processing prior to issuing all of the subtasks from the first set of subtasks to the first processing engine for processing; and issue at least one additional subtask from the first set of subtasks to the first processing engine for processing after issuing the at least one subtask from the second set of subtasks to the first processing engine for processing.

12. The multi-threaded processor of claim 11, wherein dividing the first task into the first set of subtasks comprises dividing a source block of memory specified by the copy operation into two or more sub-blocks of memory, and generating two or more copy commands for execution by the copy engine corresponding to the two or more sub-blocks of memory.

13. The multi-threaded processor of claim 12, wherein the sub-blocks of memory are aligned on a memory boundary.

14. The multi-threaded processor of claim 12, wherein the copy operation comprises a copy rectangle operation, and the sub-blocks of memory comprise two-dimensional arrays of memory.

15. The multi-threaded processor of claim 10, wherein the first task comprises a graphics operation associated with a plurality of primitives, and the subtasks in the first set of subtasks comprise at least two graphics operations associated with different subsets of primitives associated with the plurality of primitives.

16. The multi-threaded processor of claim 10, the pre-processor is further configured to track the first task and the second task in an ordered list based on priority.

17. The multi-threaded processor of claim 10, wherein the processing engine includes a FIFO that stores pending commands, and wherein the pre-processor is configured to transmit two or more subtasks to the processing engine to be queued for execution.

18. A computing device, comprising:
a system memory; and
a multi-threaded processor coupled to the system memory and including:
a processing cluster array;
one or more processing engines configured to execute tasks, and
a pre-processor coupled to the one or more processing engines and configured to:
receive a first task that is to be executed by a first processing engine that is implemented separately from the processing cluster array;
divide the first task into a first set of subtasks, wherein each subtask in the first set of subtasks is smaller than a threshold size and is to be executed by the first processing engine;
issue at least one subtask from the first set of subtasks to the first processing engine for processing;
receive a second task that also is to be executed by the first processing engine, wherein the second task has a higher priority than the first task;
divide the second task into a second set of subtasks, wherein each subtask in the second set of subtasks is smaller than the threshold size and is to be executed by the first processing engine;
preempt the first task by issuing at least one subtask from the second set of subtasks to the first processing engine for processing prior to issuing all of the subtasks from the first set of subtasks to the first processing engine for processing; and
issue at least one additional subtask from the first set of subtasks to the first processing engine for processing after issuing the at least one subtask from the second set of subtasks to the first processing engine for processing.

19. The computing device of claim 18, wherein the multi-threaded processor comprises a graphics processing unit (GPU).

20. The computing device of claim 18, wherein at least one of the one or more processing engines includes a FIFO that stores pending commands, and wherein the pre-processor is configured to transmit two or more subtasks to the processing engine to be queued for execution.

* * * * *